July 18, 1967    H. N. DIEFFENBACH ET AL    3,331,301

FILM PROCESSING MAGAZINE

Filed Sept. 18, 1964

INVENTOR.
HARRY N. DIEFFENBACH
ARTHUR L. NIELDS
BY Townsend and Townsend

ATTORNEYS 3,331,301
FILM PROCESSING MAGAZINE
Harry N. Dieffenbach, Fremont, and Arthur L. Nields, Cupertino, Calif., assignors to Mark Systems, Inc., Santa Clara, Calif.
Filed Sept. 18, 1964, Ser. No. 397,590
4 Claims. (Cl. 95—89)

This invention relates to a film magazine for winding onto a common spool for processing photographic film and mat material. The type of material to which the magazine of this invention relates has been developed by Eastman Kodak and is referred to by them as the "Bimat" process. It generally employs a photographic film which is exposed and treated prior to exposure in a manner similar to conventional photographic film. A mat material is employed which constitutes a film base having an emulsion side which is impregnated with a developing solution. After exposure of the photographic film the emulsion sides of both the film and the mat material are mated together under pressure and there retained for an interval of for example fifteen minutes or so. The chemicals carried by the mat act on the emulsion of the mat and film to cause the image on the film to develop and by the diffusion transfer method create a positive image on the mat and a negative image on the film. It can thus be seen by virtue of this process that the film is developed as a negative and the mat is developed as a positive when the two materials are later separated from each other and dried.

The most convenient manner to join the mat and the film is by rolling the two materials on a common spool under pressure; however, there are problems attendant to the regular combining of the two materials on a spool of which the present invention is designed to solve.

In the conventional aircraft camera a film is exposed in an intermediate mode, that is, exposures are effected sequentially so that the film is in continuous start and stop mode of operation. To wind such a film onto a take-up reel with the mat material would involve irregularities of pressure between the mat and the film at the time it is joined to the take-up spool.

It is the object of the present invention to provide means in the film processing magazine wherein the intermediate motion of the film, fed from the camera, is dampened to provide a continuous non-intermittent flow onto the take-up spool where it is joined with the mat material.

A feature and advantage of this invention lies in the fact that the regular or nonintermittent joinder of the two materials allows for an even pressure and constant image development formed thereby. It is also important in film processing magazines of this type where the film and the mat are to be wound on a take-up reel that means be provided to create a constant and uniform pressure between the mat and the film as it is wound onto the take-up spool.

In the present invention this is effected by the noval provision of a pressure roller which is arranged on a lever arm to tangentially contact the take-up spool in such a manner that the linear point of tangential relationship is axially aligned with the axis of rotation of the mat film take-up spool under conditions which afford a constant pressure of the roller against the spool, even though the effective diameter of the film and mat take-up spool changes due to increased loading.

Another object of the present invention is to provide in the combination of a magazine for receiving "Bimat" type film and mat material the combination of elements which allow both the film and the mat to be wound onto the take-up spool under substantially constant tension in a continuous nonintermittent flow and under constant roller pressure at the point of mating of the two materials.

A further object of the invention is to position the roller so that it engages the mat and the film after both are joined together on the radius that they will enjoy while on the spool, so that the formation of the pressure by the roller will not cause relative movement between the mat and the film during or after contact. Any movement between the mat and the film after joinder will cause a distortion or blurring of the photographic images.

Another object of the present invention is to provide means for maintaining the internal portion of the magazine at a substantially constant temperature gradient within the magazine. It has been found in the use of the "Bimat" process that variations of temperature will cause the developing solution to change its characteristics, thus rendering an image either over or underdeveloped, or in some cases where the changes of temperature are too great, will cause an uneven or generally unsatisfactory development or transfer. For this reason it is the object of this invention to provide means whereby the ambient conditions within the magazine will remain constant even though the external temperature raises or lowers above or below the required ambient temperature within the magazine. This is accomplished by the use of thermoelectric heat pump modules located strategically within the magazine and controlled by appropriate thermocouples which affect either the negative or positive power to the modules to cause the temperature within the magazine to remain within a constant predetermined range. Thus, it can be seen that in the present invention a combination is effected which will allow the combining of film and mat within a magazine so as to provide constant and controlled registration of the film and mat on the take-up spool, even under conditions where the film is being fed to the magazine intermittently and under conditions in which the temperature external of the magazine varies over relatively wide ranges. It is further apparent that because of the tension provided of the system within the magazine, regular registration can be effected even though the magazine is subjected to vibration or irregular motion during the winding or processing phase of operation.

Other objects of the present invention will become apparent upon reading the following specification and referring to the accompanying drawings in which similar characters of reference represent corresponding parts in each of the several views.

Figure 1:
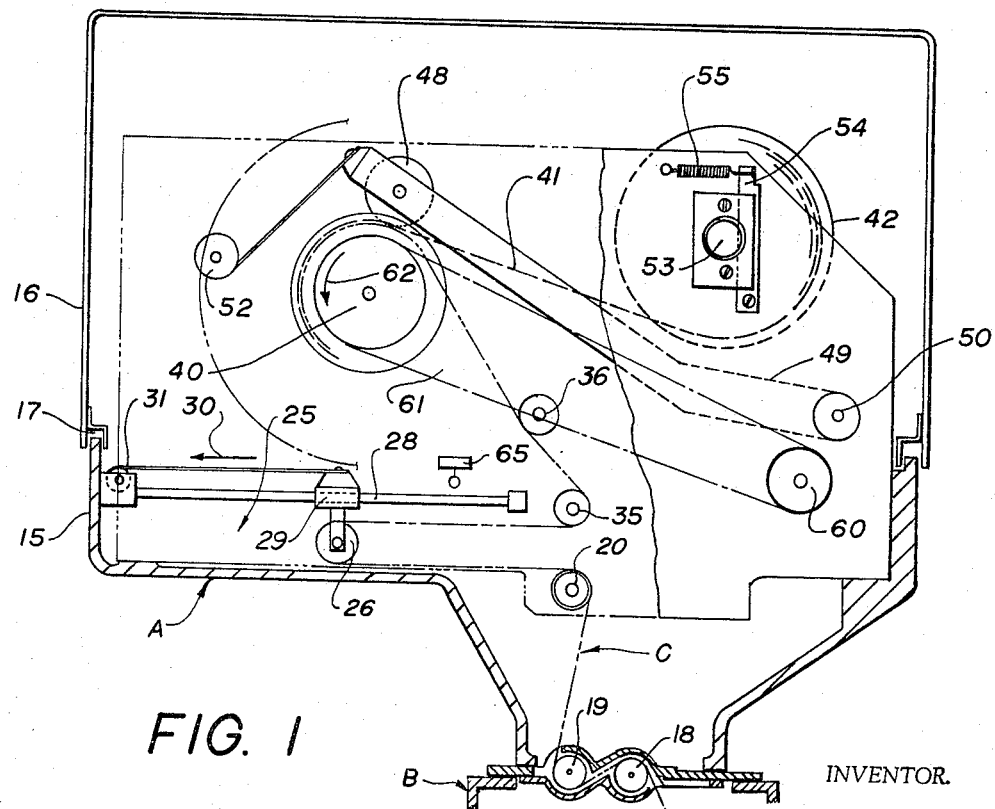
FIG. 1 is a cross-sectional view of the magazine of this invention.

In FIG. 1 there is provided a film magazine which is arranged to be mounted onto a conventional magazine A arranged to be mounted onto a conventional aircraft type camera B. The magazine is formed with a light-tight housing having a bottom half 15 and a removable top half 16 joined with a light- and air-tight seal 17 of conventional design. The film C of the "Bimat" type is arranged to proceed from the camera past a first guide spool 18 and thence to a second guide spool 19 and into the magazine. The passage of the film between the two spools provides an air and light lock. The film is then travelled across an internal guide roller 20 forming the input to the damping mechanism, generally indicated at 25. The damping mechanism comprises travelling roller 26 which is arranged to travel horizontally on a track or guide rod 28 by virtue of a carriage 29 through which the carriage and travelling roller 26 can reciprocate. Carriage 29 is urged to the left in the direction indicated by arrow 30 by a negator spring 31. The negator spring 31 is a spring which affords constant torque or pressure throughout its spring action. The spring is designed to roll onto itself and is formed in a backward wind in such a way that the torque or pressure afforded by the spring remains constant. The film then travels to an output roller 35 over a guide roller 36 and onto take-up spool 40.

Simultaneously, the mat material 41 is mounted on a mat supply reel 42 and is fed from the mat supply reel onto the take-up spool 40 where the mat is joined with the film. In this construction the emulsion side 45 is arranged to face outwardly as it is wound onto the take-up spool 40. At the same instance the emulsion side 46 of mat 41 is arranged to face inwardly as it is wound onto take-up reel 40, so that emulsion sides 45 and 46 of film C and mat 41 are joined together as they are wound onto take-up spool 40.

At the point of unity of mat 41 and film C a pressure roller 48 is arranged to tangentially urge the two materials together under sufficient pressure to cause the two emulsions to mate and cause complete developing action. The roller is mounted on a lever arm 49, pivoted at 50 and arranged to carry pressure roller 48 with its axis of rotation being absolutely parallel to the axis of rotation of take-up spool 40. It is important that the axis of the two elements be on a common axis, otherwise there will result an uneven pressure of the mat and film causing improper development. A uniform regular pressure of the pressure roller against the take-up spool 40 is effected through a negator spring 52 which, as previously described, provides a constant torque throughout all phases of operation. The torque of the negator spring provides a constant pressure tending to urge the roller 48 under constant load against film and mat take-up spool 40. The mat material is mounted on a spindle or axle 53 which is prevented or held against free rotation by a Teflon arm 54, spring-urged by spring 55 against spindle or axle 53. This mechanism provides sufficient braking force to maintain mat 41 under load or pressure as it is wound onto the take-up spool 40.

In operation, the mat material on reel 42 is previously soaked in a developing solution sufficiently so that its emulsion 46 is suitably saturated with the developing chemicals. The reel is then loaded into the magazine, and the head end of film C is threaded around reels 18, 19, 20, 26, 35, and 36 and wound together with the mat onto take-up spool 40, it being important that the emulsion side of both the film and mat be placed in face-to-face relationship as they are wound onto the take-up spool 40.

A constant torque motor arrangement 60 is arranged via belt drive 61 to drive the take-up spool in the direction as indicated by arrow 62 under sufficient torque to cause the spool to wind. A limit switch 65 is arranged for actuation under the forward condition of carriage 29 which thereby causes drive motor mechanism 60 to stop.

In operation, when film is being exposed by camera B the film intermittently is releasably fed into magazine A. Traveller roller 26 is then pulled rearwardly in the direction indicated by arrow 30 to cause an enlarged loop. As the loop enlarges, switch 65 closes, causing motor 60 to operate and cause take-up spool 40 to rotate in the direction indicated by arrow 62. Pressure roller 48 is arranged to urge the mat against the film at the tangential union of the film and mat, so that at that point the two materials are urged togther with sufficient pressure and under regular force to cause the chemical mating of the two emulsion surfaces. The irregular and intermittent motion of the film into the magazine is dampened by traveller reel or spool 26 which automatically smoothens or dampens the intermittent travel of the film to the take-up spool. The pressure of the film against guide roller 36 and the torque provided by negator spring 31 forms sufficient pressure to maintain the film under a constant state of tension throughout the winding mode of operation. At the same instance the brake mechanism afforded on shaft 53 of mat spool 42 maintains mat 41 under similar tension. By these means both the film and mat are tensioned as they are wound onto take-up spool 40. The combination of the tensioning of the mat and film together with the pressure afforded by pressure roller 48 establishes the requisite registration pressure and union required for proper mating of the two emulsions. Lever arm 49 is located for movement about an axis such that the pressure roller will maintain contact with the take-up spool 40 at the point of tangency coincident with the mating of the film and mat on the reel regardless of the amount of loading of film and mat thereon. By this means the pressure roller is always in position to engage the film and mat under pressure at the point where they are just joined to the spool or reel. Thus, the pressure is afforded at the point at which the mat and film are conformed to the diameter of the take-up spool, so that subsequent or prior deformation due to wrapping of the film and mat on the curved radius of the spool will not cause distortion or misregistration of the two materials.

Figure 3:
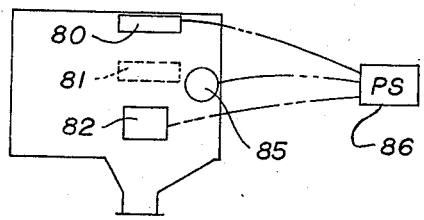
FIG. 3 is a schematic view of the housing for the magazine showing schematically suggested locations for the heat pumps and the relative connection of the thermocouple and power supply.
Figure 2:
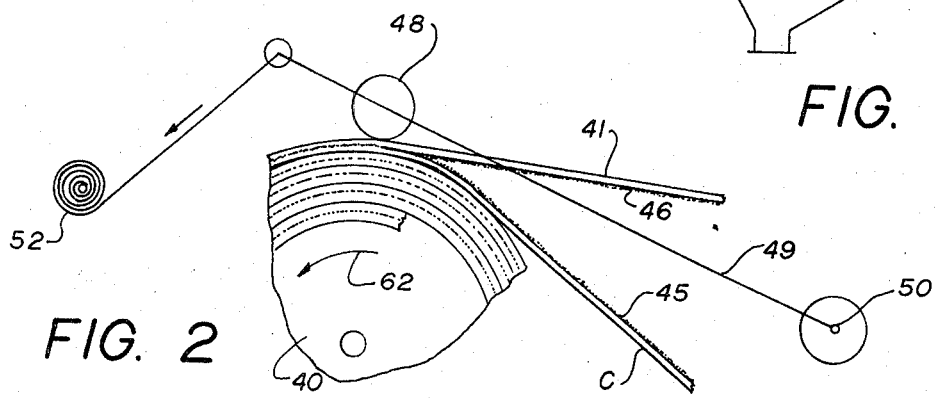
FIG. 2 is an enlarged view showing the mat and film being wound onto the take-up spool.

As previously explained, the housing A and B are joined to provide a substantially sealed chamber in which the mat and film are mated or processed. It is important that the chamber be substantially sealed to prevent an undue amount of ambient atmosphere transfer which might cause a premature evaporation of chemicals saturated in the emulsion of the mat material and to allow the chamber to be maintained at a constant temperature, so that the developing process will occur under adequate ambient temperature conditions. Control of temperature is afforded by thermo-electro heat pump modules or heat pumps 80, 81, and 82 located as seen in FIG. 3 on the top and sides of the processing magazine A. The modules can be of the type manufactured by Westinghouse and operate in heating and cooling by the "Peltier" effect. The modules operate to cool when energized by direct current of one polarity and operate in the heating mode when the polarity is reversed. The amount of current and the direction of current thus determines the extent and mode of heating and cooling. A thermocouple 85 is arranged within the magazine chamber and connected to the power supply 86. The power supply by conventional means is arranged to supply the proper potentials to the heat pumps 80, 81, and 82 to maintain the magazine at a constant predetermined temperature suitable for maintaining regular developing or processing characteristics of the "Bimat" material employed. The control of temperature is extremely important for use in aviation applications wherein near the ground the temperature may be at too high a level for proper operation and at higher altitudes the temperature may be too low. By virtue of the control of temperature in combination with the other elements of the mechanics of this device a developing mode is effected which provides regular and consistent developing throughout the entire developing mode of operation.

What is claimed is:

1. A film processing magazine of the type adapted to spool a photographic film and a developer impregnated mat together on a common spool for processing, comprising a roll of mat material, means mounting said roll of mat material within said magazine, means for feeding the photographic film into said magazine, a spool to receive said mat and said film with the emulsion side of said mat and film being disposed in face to face relation on said spool, means to rotate said spool, pressure roller means mounted in association with said spool to compress said mat and film together as it is wound on said spool, temperature sensing means mounted within said magazine, means mounted within said magazine to heat and cool said magazine control means responsive to the temperature sensed by said temperature sensing means to energize said heating and cooling means to maintain the temperature within said magazine at a predetermined range, said heating and cooling means comprising heat pumps operating by the Peltier effect and said means to energize said heating and cooling means comprises a voltage source of direct current, and means to regulate the intensity of said current and to reverse the polarity of said direct current to cause said heating and cooling means to operate in the respective heating and cooling modes.

2. A film processing magazine of the type adapted to spool a photographic film and a developer impregnated mat together on a common spool for processing, comprising a roll of mat material, means mounting said roll of mat material within said magazine, means for feeding the photographic film into said magazine, a spool to receive said mat and said film with the emulsion side of said mat and film being disposed in face to face relation on said spool, means to rotate said spool, a pressure roller, means mounting said pressure roller on an axis parallel the axis of rotation of said spool, means mounting said pressure roller for movement towards and away from said spool at a position to energize said mat and film at a point tangential to the point of contact between the film and mat on said spool, and means to urge said pressure roller against said mat and film on said spool under constant tension.

3. A film processing magazine according to claim 2 and wherein said means to urge said pressure roller under constant tension comprises a constant torque spring mounted to draw said pressure roller against said spool.

4. A film processing mazagine of the type adapted to spool a photographic film and a developer impregnated mat together on a common spool, comprising a roll of mat material, means for mounting said roll within said magazine, means for feeding film in light-tight integrity from a camera into said magazine, a spool to receive said mat and said film, means for rotating said spool, said mat and said film being disposed with their respective emulsion side in face to face relationship, a pressure roller, means mounting said pressure roller for rotation in the axis parallel with the axis of rotation of said take-up spool, means positioning said pressure roller against said take-up spool at the point of union of said mat and film, means maintaining constant pressure to said pressure roller against said take-up spool, means formulating a loop of film to dampen irregularities of film travel into said magazine and maintain the tension of said film leading to said take-up reel at a constant level, means tensioning said mat reel to provide a constant tension of mat being drawn onto said take-up spool, cooling and heating means mounted within said magazine, means to sense the temperature of said magazine and said temperature sensing being adapted means to cause said heating and cooling means to bring the temperature within a predetermined range.

References Cited

UNITED STATES PATENTS

| | | | |
|---|---|---|---|
| 2,551,892 | 5/1951 | Mitchell | 95—96 |
| 2,932,753 | 4/1960 | Arnott et al. | 240—51.11 XR |
| 2,945,429 | 7/1960 | Grant | 95—94 |
| 3,041,952 | 7/1962 | Schreck | 95—14 |
| 3,177,790 | 4/1965 | Turner et al. | 95—89 |

FOREIGN PATENTS 631,810  11/1961  Canada.

NORTON ANSHER, *Primary Examiner.*

FRED L. BRAUN, *Assistant Examiner.*